Sept. 8, 1925.
G. E. R. ROTHENBUCHER
1,552,761
ENGINE VALVE
Filed Aug. 4, 1924
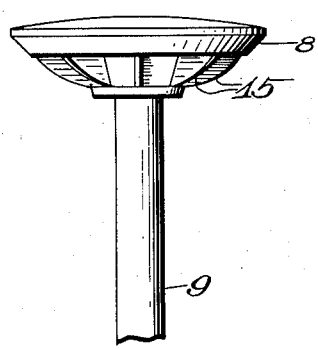
Fig. 1.
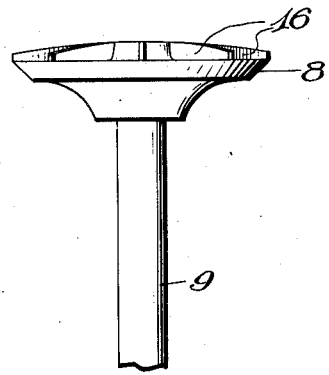
Fig. 2.
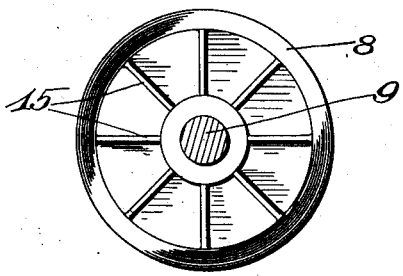
Fig. 3.
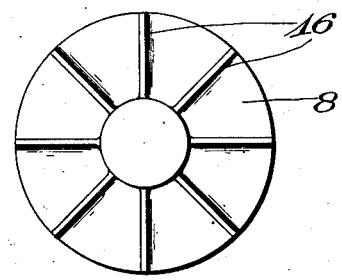
Fig. 4.
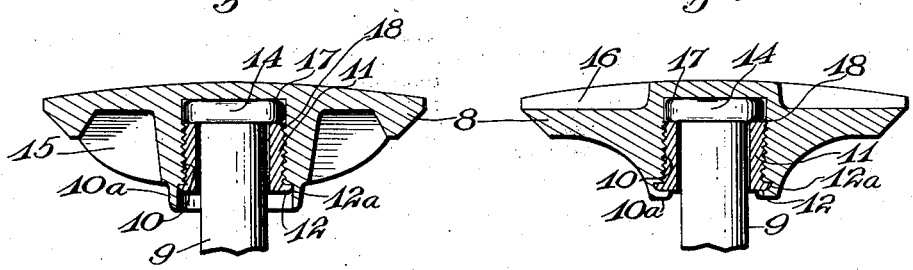
Fig. 5.
Fig. 6.
Inventor:
George E. R. Rothenbucher
by Milo B. Stevens Co.

Patented Sept. 8, 1925.

1,552,761

UNITED STATES PATENT OFFICE.

GEORGE E. R. ROTHENBUCHER, OF ELGIN, ILLINOIS.

ENGINE VALVE.

Application filed August 4, 1924. Serial No. 730,065.

*To all whom it may concern:*

Be it known that I, GEORGE E. R. ROTHENBUCHER, a citizen of the United States, residing at Elgin, in the county of Kane and State of Illinois, have invented new and useful Improvements in Engine Valves, of which the following is a specification.

This invention relates to valves for internal-combustion engines, and more particularly to valves of the poppet type. As is well known, such valves require frequent grinding to obtain a proper seating, and the invention therefore has for its object to provide a valve which is practically self-grinding, it being so constructed that it is given a slight rotary movement as it rises off its seat, this action being produced by the impact of the gases or other fluids against certain deflecting wings and the like, as will be described in detail hereinafter.

The invention brings about the object contemplated in that it makes use of the outgoing gases for the benefit of the exhaust valve, as well as of the incoming gases for the benefit of the inlet valve.

With above considerations in view, attention is directed to the accompanying drawing forming a part of the specification, in which Figure 1 is an elevation of the novel valve, designed to function for the inlet;

Fig. 2 is an elevation of the valve, modified for the exhaust;

Fig. 3 is a bottom plan view of the valve shown in Fig. 1;

Fig. 4 is a plan view of the valve shown in Fig. 2;

Fig. 5 is an enlarged vertical section of the head portion of the valve shown in Figure 1, prior to the final step in its construction; and Fig. 6 is a similar view of the valve shown in Fig. 2, as completed.

Referring specifically to the drawings, a valve of the familiar poppet type, as generally used in gas engines, is shown. In the present embodiment, the valve head 8 is rotatably mounted on the stem 9 so that it is free to turn. This condition is attained by boring the head 8 from the bottom with a tapped recess 10, which is adapted to receive an externally threaded bushing 11 made with a flanged base, as shown at 12. Before inserting the bushing, however, the valve stem 9 is introduced. Said stem is made with a round head 14 at its upper end, said head being of a diameter to smoothly enter the valve-head recess 10 when inserted therein. The bushing 11 is then slid on the stem and screwed into the recess until only a very slight amount of play exists between the stem-head 14 and the inner end of the recess 10. The valve head 8 is thus secured to the stem 9, but can rotate freely thereon. The steam head 14 is made with a slightly convex top surface 17 and a sloping bottom edge 18 to permit the valve head 8 to dip to a slight extent free of the stem, and thus facilitate the self aligning and seating of the head should some irregularity develop in the axial possition of the valve stem. To lend freedom to the aligning action, a slight amount of spacing is allowed between the valve stem and the wall of the bushing.

In order that the bushing 11 may not loosen from vibration incident to service, a permanent locking means therefor is provided. Figure 5 shows the valve stem 9 and the bushing 11 fitted as described, the mouth of the valve-head recess 10 being at this stage in the form of an annular lip or extension 10$^a$. To lock the bushing, the annular lip 10$^a$ is subjected to a pressing operation, which closes the same in upon the bushing as indicated in Figure 6, making it impossible for the bushing to recede. The efficiency of the pressing operation is facilitated by initially forming the bushing flange 12 with a rounded outer edge as indicated at 12$^a$, so that the flange 10$^a$ will experience a rolling action to aid it in closing upon the bushing.

To secure the automatic periodical rotation of the valves and accomplish the self-grinding thereof, as first mentioned, the head of the inlet valve is formed with a radial series of ribs 15 underneath, as shown in Figures 1, 3 and 5; and the exhaust valve head is similarly ribbed on top at 16, as shown in Figures 2, 4 and 6. Thus, the incoming charge, striking the head of the inlet valve on the underside will act upon the ribs 15 to move or rotate the head to some extent, proportionate with the velocity with which the gases are drawn into the engine cylinder; and so with the exhaust valve as effected by the outgoing gases. The impulse-imparting action of the gases on the respective valve heads is more evident from the fact that the gases must of necessity take a lateral course into, or out of, the cylinder through the valve openings, so that the impact of such gases with the ribbed surfaces of the heads, coupled with the freely-rotatable condition thereof on the stems while the valves are lifted from the seats, will induce the desired periodical motion of the heads automatically as the engine runs.

From the above description, it will be apparent that a valve of simple construction and evident utility is had. The freedom of the valve head with respect to the stem, and the means whereby it may be moved periodically by the impulses of the incoming or outgoing engine gases, make the present structure a valve which is self aligning, self grinding, self cleaning, and a preventive of carbon formations. The valve thus requires no attention for long periods, reduces stalling tendency on the part of the engine, and adds materially to the efficiency of the latter.

I claim:

1. A valve for use on internal combustion engines, comprising a head having a central boss provided with an internally-threaded socket and an annular lip at one end of the socket, said head being provided with a plurality of radial fluid contact ribs formed integral with said boss to strengthen and reinforce the same, a stem having a disk-shaped head received in said socket, and a bushing threaded in said socket to hold the head of the stem in place, and being provided at the rear end thereof with an annular stop flange, said annular lip being flatly engaged with said flange to hold the flange and the bushing firmly in place, the upper side of the head of said stem being convexed for engagement with one wall of said socket.

2. A poppet valve for internal combustion engines comprising a head bored from the bottom with a recess having a tapped entrance; a stem headed at its upper end to seat in the recess; and a bushing slid upon the stem to its head by being firmly screwed into the entrance of the recess and retained therein by contracting the mouth of the latter.

3. A poppet valve for internal combustion engines having a head made with projections on that face against which a flow of engine gases is directed and bored from the bottom with a recess; a stem headed at its upper end to seat in the recess; and a bushing slid upon the stem to its head and firmly secured to the valve head and retained therein by contracting the mouth of said recess.

In testimony whereof I affix my signature.

GEORGE E. R. ROTHENBUCHER.